United States Patent [19]
Kohno et al.

[11] Patent Number: 5,736,185
[45] Date of Patent: Apr. 7, 1998

[54] METHOD FOR SUPPRESSING GRASSY SMELL AND ACID TASTE OF VEGETABLES AND FRUIT

[75] Inventors: Hiroyuki Kohno, Nagoya; Hitomi Yoshimura, Chita; Tatsuya Uraji, Nagoya, all of Japan

[73] Assignee: Nikken Chemicals Co., Ltd., Tokyo, Japan

[21] Appl. No.: 687,058

[22] Filed: Aug. 7, 1996

[30] Foreign Application Priority Data

Aug. 21, 1995 [JP] Japan .................. 7-233182
Jul. 9, 1996 [JP] Japan .................. 8-196968

[51] Int. Cl.$^6$ .................................................. A23L 2/06
[52] U.S. Cl. .................. 426/589; 426/599; 426/616; 426/634; 426/639
[58] Field of Search .................. 426/330.5, 590, 426/599, 589, 598, 616, 615, 634, 629, 639, 548, 658, 533, 534

[56] References Cited

U.S. PATENT DOCUMENTS

| | | | |
|---|---|---|---|
| 2,563,885 | 8/1951 | McColloch | 426/616 |
| 2,854,343 | 9/1958 | Strashun et al. | 426/599 |
| 2,935,407 | 5/1960 | Haman | 426/616 |
| 3,102,817 | 9/1963 | Green | 426/533 |
| 3,114,641 | 12/1963 | Sperti et al. | 426/599 |
| 3,227,562 | 1/1966 | Houghtaling et al. | 426/599 |
| 3,432,305 | 3/1969 | Kuhr et al. | 426/589 |
| 3,876,794 | 4/1975 | Rennhard | 426/152 |
| 4,031,265 | 6/1977 | Guadagni et al. | 426/599 |
| 4,304,794 | 12/1981 | Dwivedi et al. | 426/548 |
| 4,770,889 | 9/1988 | Sakai et al. | 426/548 |
| 4,840,804 | 6/1989 | Kondou | 426/103 |
| 4,883,685 | 11/1989 | Kondou | 426/658 |
| 4,886,667 | 12/1989 | Kondou | 426/548 |
| 4,888,183 | 12/1989 | Kondou | 426/34 |
| 4,902,525 | 2/1990 | Kondou | 426/548 |
| 5,013,576 | 5/1991 | Nakazawa et al. | 426/640 |
| 5,024,845 | 6/1991 | Thorton et al. | 426/599 |
| 5,049,402 | 9/1991 | Tamaki et al. | 426/599 |
| 5,080,916 | 1/1992 | Kondou | 426/658 |
| 5,244,690 | 9/1993 | Van der Schueren et al. | 426/660 |
| 5,437,880 | 8/1995 | Takaichi et al. | 426/73 |
| 5,567,467 | 10/1996 | Kondou et al. | 426/659 |

FOREIGN PATENT DOCUMENTS

| | | |
|---|---|---|
| 0 301 502 | 2/1989 | European Pat. Off. . |
| 59-11156 | 1/1984 | Japan . |
| 62-40258 | 2/1987 | Japan . |

OTHER PUBLICATIONS

Database WPI, Section Ch, Week 9108, Derwent Publications Ltd., London, GB; Class D13, AN 91-054413, XP002014947 of JP-A-03 004 746 (Meiji Seika Kaisha) 10 Jan. 1991 & Patent Abstracts of Japan, vol. 015, No. 112 (C-0815), 18 Mar. 1991 of JP-A-03 004746 (Meiji Seika Kaisha), 1 Jun. 1989.

Database WPI, Section Ch, Week 8834, Derwent Publications Ltd., London, GB; Class D16, AN 88-239546, XP002014956 of JP-A-63 173 572 (Mitsubishi Chem Ind KK), 18 Jul. 1988.

Database WPI, Section Ch, Week 8849, Derwent Publications Ltd., London, GB; Class D13, AN 88-348680, XP002014948, of JP-A-63 258 565 (Mitsubishi Chem Ind KK), 26 Oct. 1988.

Patents Abstracts of Japan, vol. 95, No. 010 of JP-A-07 274829 (Mitsubishi Chem Corp), 24 Oct. 1995.

*Primary Examiner*—Cynthia L. Nessler
*Attorney, Agent, or Firm*—Frishauf, Holtz, Goodman, Langer & Chick, P.C.

[57] ABSTRACT

Disclosed herein is a method of suppressing and masking the grassy smell and acid taste characteristic of vegetables and fruits, thereby making food and drink more palatable, by adding erythritol to food and drink in their production from vegetables and fruits having a strong grassy smell and acid taste. The thus added erythritol also improves the taste of food and drink without adversely affecting the natural taste of vegetables and fruits and without increasing their sweetness. The method comprises adding to food and drink erythritol in an amount of 0.2 to 3.0 wt % of their weight.

12 Claims, No Drawings

METHOD FOR SUPPRESSING GRASSY SMELL AND ACID TASTE OF VEGETABLES AND FRUIT

FIELD OF THE INVENTION

The present invention relates to a method of suppressing or masking the grassy smell and acid taste of vegetables and fruits. More particularly, the present invention relates to a method of effectively suppressing or masking the grassy smell and acid taste characteristic of vegetables and fruits in the production of food and drink from vegetables and fruits having a strong grassy smell or acid taste, thereby making such food and drink palatable.

BACKGROUND OF THE INVENTION

Because of their high content of vitamins, minerals, and dietary fiber, such vegetables as carrot, tomato, celery, and cabbage and such fruits as mandarin orange, apple, grapefruit, and lemon have recently come to be consumed in large quantities in the form of juice, puree, or soup in response to the recent change in eating habits for those seeking improved health and improved eating habits. Unfortunately, these foods and drinks are usually hard to be eaten or drunk. It is generally due to the characteristic taste and smell of vegetables such as a grassy smell and an acrid taste and due to those of fruits such as an acid taste, bitter a taste and a grassy smell.

One conventional means to address this problem was to add a spice to vegetable juice. However, the spice adversely affects the flavor and does not always suppress the grassy smell of vegetable. There has been proposed a method for masking the grassy smell of vegetable juice by adding methyl ester of α-L-aspartyl-L-phenylalanine (in Japanese Patent Laid-open No. 11156/1984) or by adding glycine and/or alanine (in Japanese Patent Laid-open No. 40258/1987). These methods, however, were not necessarily satisfactory from the standpoint of suppressing the grassy smell.

SUMMARY OF THE INVENTION

The present invention was completed to address the above-mentioned problem involved in the conventional technology. Accordingly, it is an object of the present invention to provide a method of effectively suppressing or masking the grassy smell and acid taste characteristic of vegetables and fruits in the production of food and drink from vegetables and fruits having a strong grassy smell or acid taste, thereby making such food and drink palatable. It is another object of the present invention to provide a method of improving the flavor of food and drink produced from vegetables and fruits having a strong grassy smell and acid taste.

The present inventors carried out a series of researches to address the above-mentioned problem associated with food and drink having the grassy smell and acid taste characteristic of vegetables and fruits. As the result, they found that it is possible to suppress or mask the grassy smell and acid taste of vegetables and fruits, thereby improving the flavor of food and drink made therefrom, by adding to them erythritol which is one species of sugar alcohols. This finding led to the present invention.

DETAILED DESCRIPTION OF THE INVENTION

The gist of the present invention resides in a method of suppressing the grassy smell and acid taste characteristic of vegetables and fruits in the production of food and drink from vegetables and fruits having a strong grassy smell and acid taste, said method comprising adding erythritol in an amount of 0.2 to 3.0 wt % of the weight of the product.

As to food and drink made from vegetables and fruits with a strong grassy smell and acid taste, the present invention may be suitably applied to food and drink produced especially from the following vegetables for which it is necessary to suppress or mask their grassy smell: tomato, celery, cabbage, aloe, cornfree, morohaiya, spinach, bean sprout, cucumber, garland chrysanthemum, pumpkin, green pepper, lettuce, sunny lettuce, pulse such as green peas and broad bean and roots such as carrot, radish, edible burdock, etc.; and the following fruits for which it is necessary to suppress or mask their acid taste: citrus fruits such as mandarin orange (Unshu mandarine orange), summer orange, Hassaku (citrus hassaku), lime, grapefruit, lemon, etc., grape, melon, oriental melon, watermelon, apple, peach for canning, etc., and especially citrus fruits are applicable.

The present invention may be applied to food and drink of any type, typically in the form of juice, puree, and soup produced from vegetables, or in the form of juice, puree, nectar, and cans produced from fruits (especially juice). Juice may include a "mixed juice" of vegetables and fruits (mixed drink with fruit juice).

The food and drink to which the present invention may be applied may be any food and drink made from and composed mainly of vegetables and fruits and may contain ancillary materials and additives which are commonly used in the food industry.

The present invention will be useful particularly for removing the grassy smell from tomato juice and carrot juice (or mixed juice with fruit juice) which are expected to have an increasing demand. The present invention may also be effective in removing the grassy smell from green vegetable juice etc. and suppressing the acid taste and bitter taste of citrus fruits such as grapefruit and mandarin orange.

According to the present invention, erythritol is added to food and drink during their production from the above-mentioned vegetables and fruits having a strong grassy smell and acid taste.

Erythritol used in the present invention is a saccharide having four consecutive carbons which exists naturally and is contained in fungi, fruits (such as melon), and fermented foods (such as Mirin (sweet sake), soy sauce, and wine). It is a known sugar alcohol in the form of colorless, transparent crystal having a melting point of 119° C. and a molecular weight of 122. It has a sweetness equivalent to 75% of that of sucrose. It has good heat resistance, acid resistance, and alkali resistance and is chemically stable. It is physiologically characterized by non-cariosity, non-calorific value, and non-insulin dependence.

Erythritol is commercially available in the form of crystalline powder, and any commercial product can be used in the present invention. A commercial product may resemble granulated sugar in appearance (grain size) or may be in the form of fine powder. Both may be used as such in the present invention. An example is one which is available from Nikken Chemicals Co., Ltd. It is known as a sweetener but nothing is known about the fact that it can suppress or mask the grassy smell and acid taste.

According to the present invention, the above-mentioned erythritol is added in an amount of 0.2–3.0 wt %, preferably 0.8–2.0 wt %, of the weight of the product in the production of food and drink from vegetables and fruits having a strong grassy smell and acid taste. The optimum amount of erythritol varies depending on the form and raw materials of the food and drink to which it is added. Usually an amount of 0.2-1.0 wt % will be enough to suppress the grassy smell, acid taste, acrid taste, and bitter taste regardless of the form and raw material (vegetable or fruit) of the food and drink without causing the food and drink to taste sweetness of erythritol. With an amount in excess of 1.0 wt % (but less than 3.0 wt %), erythritol apparently adds to the sweetness, further softens the acid taste and bitter taste and makes the food and drink taste milder.

According to the present invention, a noticeable effect on improvement of flavor like grassy smell, acid taste, etc. is produced when the amount of erythritol is in the range of 0.2 to 3.0 wt %. With an amount less than 0.2 wt %, erythritol does not produce a noticeable effect; with an amount in excess of 3.0 wt %, erythritol adds to the sweetness to such an extent that the natural taste of vegetables and fruits themselves are lost, although it suppresses the grassy smell and acid taste. Either case is not preferable.

As mentioned above, erythritol is thermally stable and unreactive to effective components contained in vegetables and fruits such as vitamins and amino acids. Consequently, there are no restrictions on how to and when to add erythritol to food and drink. It is only important to employ a method which ensures the uniform distribution of erythritol in food and drink.

Incidentally, if necessary, it is possible to use erythritol in combination with any known masking material or spice in an amount not harmful to the effect of the present invention.

The present invention as mentioned above effectively suppresses the grassy smell and acid taste characteristic of vegetables and fruits and hence make vegetable juice and mandarin orange juice palatable for those who dislike them because of their grassy smell, acid taste and bitter taste, and makes them highly suitable to anyone's taste.

To further illustrate this invention, and not by way of limitation, the following examples are given.

EXAMPLE 1

Erythritol (from Nikken Chemicals Co., Ltd.) was added in different amounts to salt-free 100% tomato juice. With erythritol completely dissolved, the resulting samples were compared with a control in a sensory test by 8 panelists. The results are shown in Table 1.

TABLE 1

| | | Amount added (wt %) | | | | | | | |
|---|---|---|---|---|---|---|---|---|---|
| | | 0.2 | 0.5 | 0.8 | 1.0 | 2.0 | 2.5 | 3.0 | 3.5 |
| Grassy smell | Strong | | | | | | | | |
| | No change | 2 | 1 | 1 | | | | | |
| | Weak | 6 | 5 | 2 | 3 | 1 | | | |
| | None | | 2 | 5 | 5 | 7 | 8 | 8 | 8 |
| Taste | Unpalatable | | | | | | | | |
| | No change | 3 | 1 | 1 | | | | | |
| | Palatable | 5 | 7 | 6 | 5 | 4 | 2 | 1 | |
| | Like sweet juice | | | 1 | 2 | 3 | 4 | 5 | 2 |
| | Too sweet | | | | 1 | 1 | 2 | 2 | 6 |

It is noted from Table 1 that erythritol added in an amount more than 0.2 wt % suppresses the grassy smell of tomato juice and that erythritol added in an amount of 3.5 wt % makes the tomato juice too sweet. It is apparent that an amount in the range of 0.8 to 2.0 wt % is just enough to suppress the grassy smell of tomato juice almost completely and even to improve the taste of tomato juice.

EXAMPLE 2

Erythritol (from Nikken Chemicals Co., Ltd.) was added in different amounts to 100% carrot juice. With erythritol completely dissolved, the resulting samples were compared with control in a sensory test by 8 panelists. The results are shown in Table 2.

TABLE 2

| | | Amount added (wt %) | | | | | | | |
|---|---|---|---|---|---|---|---|---|---|
| | | 0.2 | 0.5 | 0.8 | 1.0 | 2.0 | 2.5 | 3.0 | 3.5 |
| Grassy smell | Strong | | | | | | | | |
| | No change | 1 | 1 | | | | | | |
| | Weak | 7 | 4 | 2 | 1 | | | | |
| | None | | 3 | 6 | 7 | 8 | 8 | 8 | 8 |
| Taste | Unpalatable | | | | | | | | |
| | No change | 2 | 1 | 1 | | | | | |
| | Palatable | 6 | 7 | 7 | 4 | 3 | 2 | 1 | 1 |
| | Like sweet juice | | | | 3 | 4 | 5 | 5 | 2 |
| | Too sweet | | | | 1 | 1 | 1 | 2 | 5 |

It is noted from Table 2 that erythritol added in an amount more than 0.2 wt % suppresses the grassy smell of carrot juice and that erythritol added in an amount of 3.5 wt % makes the carrot juice too sweet. It is apparent that an amount in the range of 0.8 to 2.0 wt % is just enough to suppress the grassy smell of carrot juice almost completely and even to improve the taste of carrot juice.

EXAMPLE 3

A test sample was prepared by adding erythritol in an amount of 0.5 wt % to 100% carrot juice. A comparative sample was prepared by adding sucrose in an amount of 0.375 wt % to 100% carrot juice. (Sucrose is added to make the latter sample as sweet as the former sample.) The effect of erythritol and sucrose was examined by comparing each sample with a control (nothing is added) in a pair test by 16 panelists. The results are shown in Table 3 (comparison with erythritol with control) and Table 4 (comparison with sucrose with control).

TABLE 3

| | Control | Sample with erythritol |
|---|---|---|
| Grassy smell | 14 | 2 |
| Palatable | 2 | 14 |
| General evaluation | 2 | 14 |

TABLE 4

| | Control | Sample with sucrose |
|---|---|---|
| Grassy smell | 9 | 7 |
| Palatable | 8 | 8 |
| General evaluation | 8 | 8 |

It is noted from Tables 3 and 4 that control apparently has a remaining grassy smell and that the erythritol-containing sample is more palatable and more preferable in general than the sucrose-containing sample.

EXAMPLE 4

Test samples were prepared by adding erythritol in an amount of 0.5 wt %, 1.0 wt %, and 2.0 wt % to a drink composed of 20 wt % vegetable juice (of morohaiya and spinach, etc.) and 80 wt % fruit juice (of apple, muscat, and grapefruit, etc.). The samples were compared with control (nothing is added) in a sensory test by 8 panelists. The results are shown in Table 5.

TABLE 5

| Amount of erythritol | Degree of grassy smell | Taste |
| --- | --- | --- |
| 0.5 wt % | Weak | Plain, without aftertaste |
| 1.0 wt % | None | Slightly sweet, mild |
| 2.0 wt % | None | Slightly sweet, mild |

EXAMPLE 5

A test sample was prepared by adding erythritol in an amount of 0.5 wt % to 100% carrot juice. A comparative sample was prepared by adding glycine in an amount of 0.5 wt % to 100% carrot juice (according to Japanese Patent Laid-open No. 40258/1987). The effect of suppressing a grassy smell was examined in a pair test by 15 panelists. The results are shown in Table 6. It is apparent that a grassy smell remained more in the glycine-containing sample than in the erythritol-containing sample.

TABLE 6

| Evaluation | No. of panelists |
| --- | --- |
| Panelists who felt that the erythritol-containing sample had a stronger grassy smell | 4 |
| Panelists who felt that the glycin-containing sample had a stronger grassy smell | 9 |
| Panelists who felt that both sample had a stronger grassy smell at the same level | 2 |

EXAMPLE 6

A test sample was prepared by adding erythritol in an amount of 1.5 wt % to 100% carrot juice. A comparative sample was prepared by adding aspartame (methyl ester of α-L-aspartyl-L-phenylalanine) in an amount of 0.001 wt % to 100% carrot juice (according to Japanese Patent Laid-open No. 11156/1984). The effect of suppressing a grassy smell was examined in a pair test by 15 panelists. The results are shown in Table 7. It is apparent that a grassy smell remained more in the aspartame-containing sample than in the erythritol-containing sample.

TABLE 7

| Evaluation | No. of panelists |
| --- | --- |
| Panelists who felt that the erythritol-containing sample had a stronger grassy smell | 4 |
| Panelists who felt that the aspartame-containing sample had a stronger grassy smell | 11 |
| Panelists who felt that both sample had a stronger grassy smell at the same level | 0 |

EXAMPLE 7

A test sample was prepared by adding erythritol in an amount of 1.0 wt % to 100% mandarin orange juice (Unshu mandarine orange juice). A comparative sample was prepared by adding sucrose in an amount of 0.75 wt % to 100% mandarin orange juice. (Sucrose is added to make the latter sample as sweet as the former sample.) The effect of erythritol and sucrose was examined by comparing each sample with control (nothing is added) in a pair test by 16 panelists. The results are shown in Table 8 (comparison with erythritol with control) and Table 9 (comparison with sucrose with control).

TABLE 8

|  | Control | Sample with erythritol |
| --- | --- | --- |
| Strong acid taste | 15 | 1 |
| Palatable | 3 | 13 |
| General evaluation | 3 | 13 |

TABLE 9

|  | Control | Sample with sucrose |
| --- | --- | --- |
| Strong acid taste | 10 | 6 |
| Palatable | 7 | 9 |
| General evaluation | 8 | 8 |

It is noted from Tables 8 and 9 that control apparently has a strong acid taste and that the erythritol-containing sample is more palatable and more preferable in general than the sucrose-containing sample.

EXAMPLE 8

A test sample was prepared by adding erythritol to 20% grapefruit juice of the composition shown in Table 10. A comparative sample was prepared by adding to the grapefruit juice isomerized sugar in an amount sufficient to make the latter sample as sweet as the former sample. The effect of erythritol and isomerized sugar was examined in a pair test by 16 panelists. The results are shown in Table 11.

TABLE 10

|  | Comparative sample without erythritol | Test sample with erythritol |
| --- | --- | --- |
| Grapefruit juice, ⅙ concentrated (g) | 33.3 | 33.3 |
| Sucrose (g) | 7 | 7 |
| Isomerized sugar, 75% (g) | 113.3 | 86.7 |
| Erythritol (g) | 0 | 20 |
| Citric acid (g) | 2 | 2 |
| Grapefruit flavor (g) | 1 | 1 |
| Water (g) | 843.4 | 850 |
| Total (g) | 1000 | 1000 |

TABLE 11

|  | Comparative sample without erythritol | Test sample with erythritol |
| --- | --- | --- |
| Strong bitter taste | 12 | 4 |
| Strong acid taste | 14 | 2 |
| Palatable | 1 | 15 |
| General evaluation | 3 | 13 |

It is noted from Table 11 that the test sample with erythritol has a weaker bitter taste and acid taste and is more palatable and more preferable in general than the comparative sample without erythritol.

EFFECT OF THE INVENTION

The present invention provides a method of suppressing and masking the grassy smell and acid taste characteristic of vegetables and fruits, thereby making food and drink more palatable, by adding erythritol to food and drink in their production from vegetables and fruits having a strong grassy smell and acid taste. The thus added erythritol also improves the taste of food and drink without adversely affecting the natural taste of vegetables and fruits and without increasing their sweetness. In addition, since the added erythritol a non-calorific value, there is no fear of deteriorating food and drink for health.

What is claimed is:

1. A method of suppressing the grassy smell and acid taste characteristic of vegetables and fruits in the production of a food or drink product from vegetables and fruits having a strong grassy smell and acid taste, said method comprising adding to the product erythritol in an amount of 0.2 to 3.0 wt % of the weight of the product.

2. A method of suppressing the grassy smell characteristic of vegetables in the production of a food or drink product from vegetables having a strong grassy smell, said method comprising adding to the product erythritol in an amount of 0.2 to 3.0 wt % of the weight of the product.

3. The method as defined in claim 2, wherein the food or drink made from vegetables is juice, puree, or soup.

4. The method as defined in claim 2, wherein the food or drink made from vegetables is tomato juice, carrot juice, or a mixed juice containing fruit juice of different fruits.

5. The method as defined in claim 2, wherein the erythritol is added in an amount of 0.8 to 2.0 wt % of the weight of the product.

6. The method as defined in claim 2, wherein the erythritol is added in an amount of 0.2 to 1.0 wt % of the weight of the product.

7. The method as defined in claim 6, wherein the resultant food or drink consists essentially of a food or drink made from at least one vegetable and the erythritol.

8. A method of suppressing the acid taste characteristic of fruits in the production of a food or drink product from fruits having a strong acid taste, said method comprising adding erythritol to the product in an amount of 0.2 to 3.0 wt % of the weight of the product.

9. The method as defined in claim 8, wherein the food or drink made from fruits is juice produced from a citrus fruit.

10. The method as defined in claim 8, wherein the erythritol is added in an amount of 0.8 to 2.0 wt % of the weight of the product.

11. The method as defined in claim 8, wherein the erythritol is added in an amount of 0.2 to 1.0 wt % of the weight of the product.

12. The method defined in claim 11, wherein the resultant food or drink consists essentially of a food or drink made from at least one fruit and the erythritol.

* * * * *